No. 804,423. PATENTED NOV. 14, 1905.
J. MILLER.
MACHINE FOR MAKING CEMENT BLOCKS.
APPLICATION FILED JAN. 7, 1905.
3 SHEETS—SHEET 2.
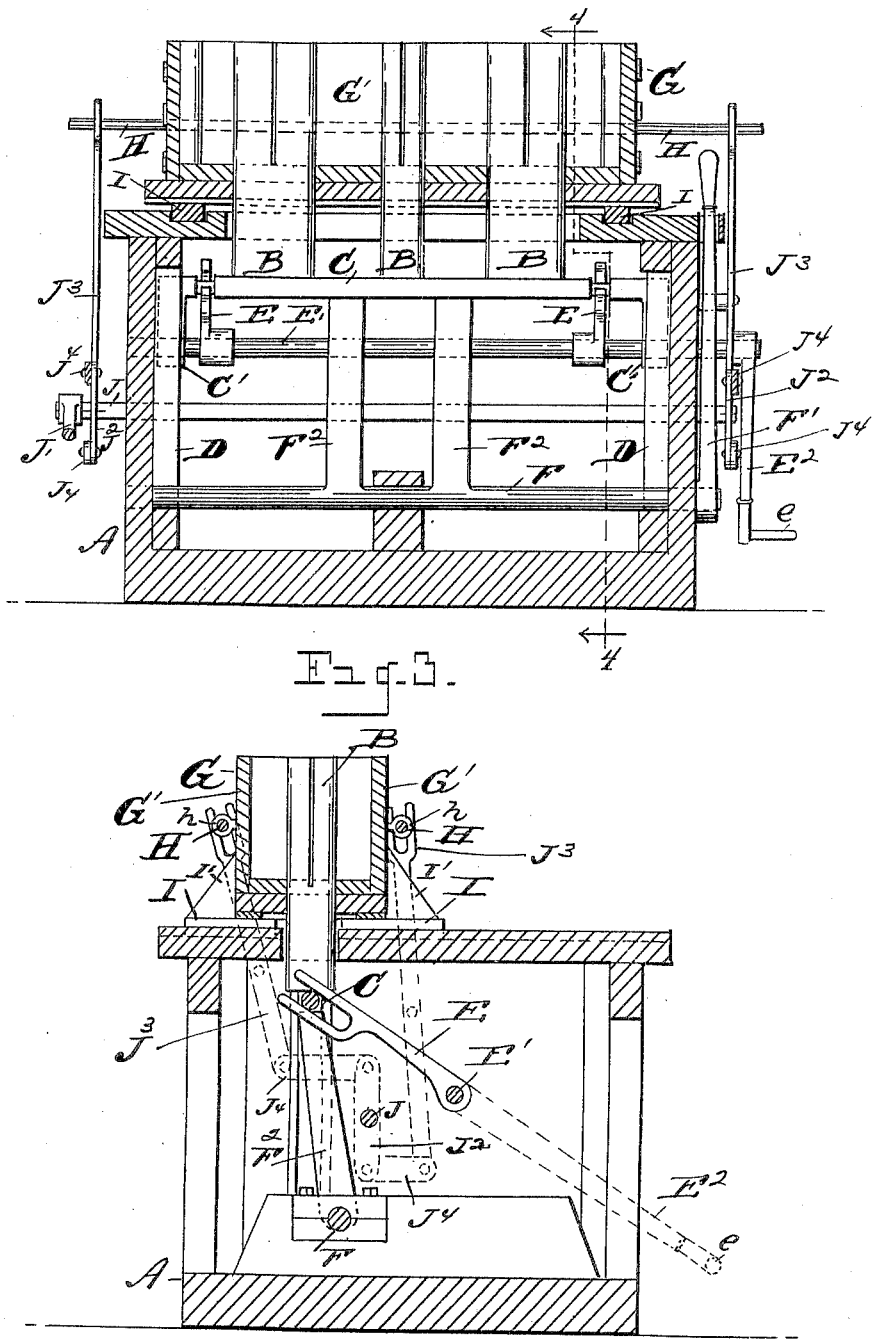

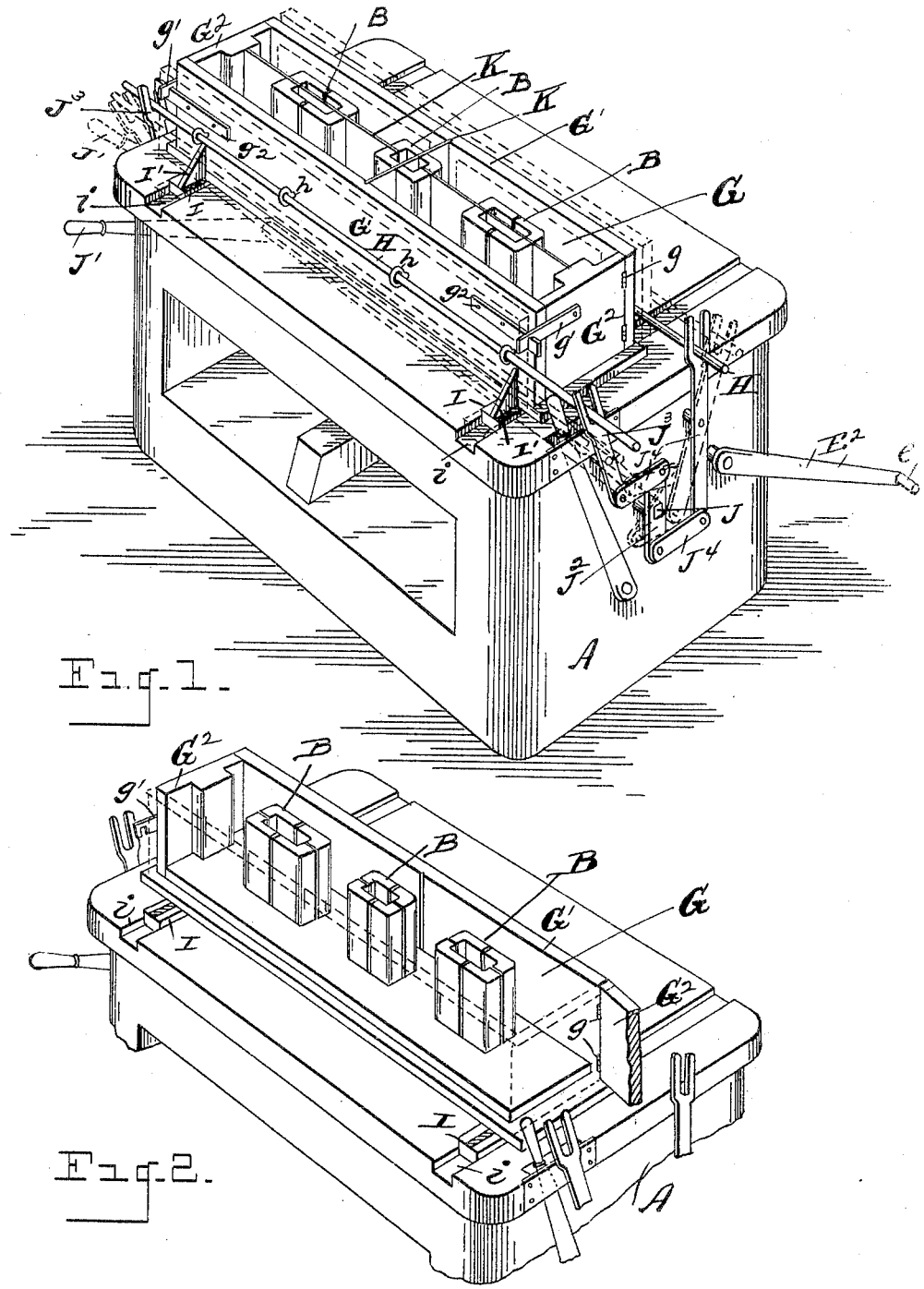

No. 804,423. PATENTED NOV. 14, 1905.
J. MILLER.
MACHINE FOR MAKING CEMENT BLOCKS.
APPLICATION FILED JAN. 7, 1905.
3 SHEETS—SHEET 3.
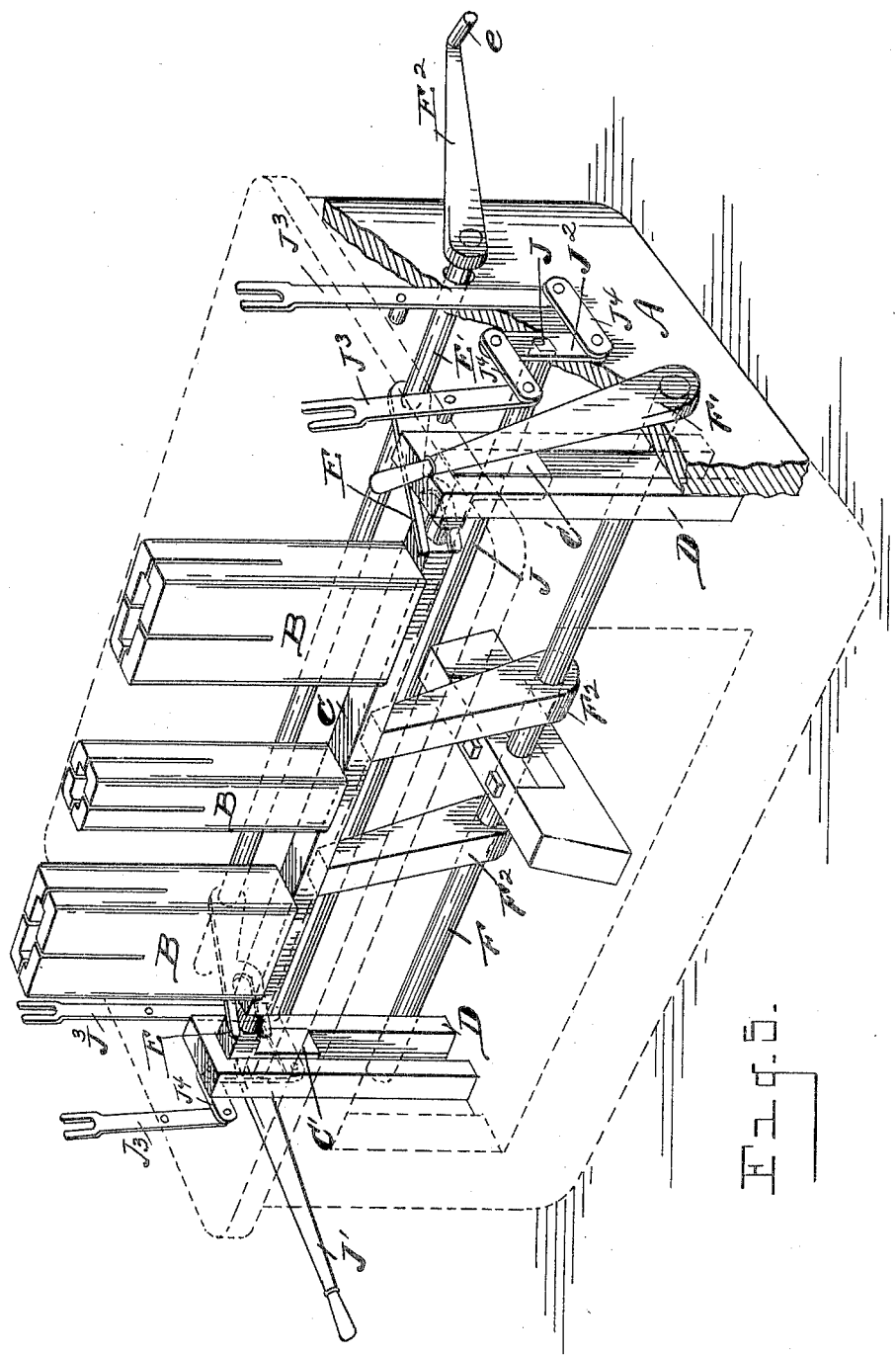

UNITED STATES PATENT OFFICE.

JOHN MILLER, OF MINNEAPOLIS, MINNESOTA.

MACHINE FOR MAKING CEMENT BLOCKS.

No. 804,423.  Specification of Letters Patent.  Patented Nov. 14, 1905.

Application filed January 7, 1905. Serial No. 240,043.

*To all whom it may concern:*

Be it known that I, JOHN MILLER, a citizen of the United States, residing at Minneapolis, county of Hennepin, State of Minnesota, have invented a certain new and useful Improvement in Machines for Making Cement Blocks; and I declare the following to be a full, clear, and exact description of the invention, such as will enable others skilled in the art to which it pertains to make and use the same, reference being had to the accompanying drawings, which form a part of this specification.

My invention relates to an improvement in machines for making hollow cement blocks shown in the accompanying drawings and more particularly set forth and described in the following specification and claims.

In the drawings, Figure 1 is a perspective view of the machine, showing the top of the molding-box removed and the partitions in place for forming what is known as a "veneer" stone. Fig. 2 is a similar view of the top of the machine, showing one of the sides of the molding-box and the dividing-partitions removed. Fig. 3 is a longitudinal section of the machine. Fig. 4 is a cross-sectional view of the machine on line 4 4 of Fig. 3 looking in the direction indicated by the arrows. Fig. 5 is a perspective view of the raising and supporting mechanism inclosed within the frame of the machine, the frame being broken away, but indicated in dotted lines, to disclose the mechanism.

One of the objects of my invention is to provide means which by the operation of a lever will remove the sides of the molding-box in order that the green block, with the base-board, may be readily removed to be replaced by another molding-box base-board to receive a new block.

Another feature of my invention is the means employed to form two veneer stones at one operation.

A further object of my invention is the means employed to raise and support the cores used in forming the hollow blocks.

Referring to the letters of reference shown in the drawings, A is the frame of the machine.

B represents the cores, preferably hollow and supported on a cross member C, having depending legs C' traveling in a suitable guide D, secured to the upright walls of machine.

E represents forked arms mounted on a shaft E', operated by a lever $E^2$, having a short arm $e$ for convenience in operating the same by the foot. As shown in Figs. 4 and 5 of the drawings, the tines of the forked arms E engage the cross member C at a point where it is provided with a circular formation, whereby it is more readily embraced and operated by the movement of the arms E.

F is a shaft mounted in suitable bearings and operated by a lever F'. Mounted on the shaft F are dogs $F^2$, designed to support the cross member C and the cores B, mounted thereon, when the same are in an elevated position, as shown in Figs. 4 and 5.

G is the molding box or frame, consisting of the side walls G' G' and the end walls $G^2$ $G^2$. The inner face of the side and end walls may be provided with a rock-face or other formation, whereby the same surfaces are produced in the resulting cement block. I prefer that the end walls $G^2$ may be hinged, as shown at $g$, to one of the side walls of the molding-frame, as shown in Figs. 1 and 2.

$g'$ $g'$ are suitable swinging latches pivoted to the end wall $G^2$, designed to engage correspondingly-constructed catches $g^2$ $g^2$, secured to the side walls G'.

H represents rods secured to the side walls G' by screw-eyes $h$, in which the rods are loosely sleeved.

I I are cross members traveling in channels $i$, formed in the table-top A'. The side walls G' of the molding-box are secured to the cross member I by means of brackets I'.

J is a shaft having its bearings in the frame of the machine and provided with an operating-lever J'.

$J^2$ $J^2$ are rocking arms mounted on each end of the shaft J.

$J^3$ $J^3$ are forked arms pivoted in the frame of the machine and having a link connection $J^4$ $J^4$ with the rocking arms $J^2$. As shown in Figs. 1, 2, and 4, the tines of the forked arms $J^3$ straddle the rods H, and when the side walls of the molding-box are disengaged from the end walls by unlatching the locking-catch the walls may be spread apart by operating the lever J', as shown by the dotted lines in Fig. 1.

K K are partitions dividing the molding-box when it is desired to make what is known as "veneer stone." These partitions are inserted in kerfs cut in the cores B. When it is desired to make a complete block, the partitions are removed.

Having indicated the several parts I will now describe the operation of the machine.

The cores B are raised to an elevated position by operating the lever $E^2$. The lever $F'$ is then thrown so that the upper ends of the dogs $F^2$ are directly beneath the cross member C, on which the cores are mounted. By this means the cores are supported in their elevated position. The bottom of the molding-board is then put in place and the sides G, with their hinged ends, assembled, with the rods H supported by their eyes $h$ and engaged by the forked arms $J^3$. The lever $J'$ is then operated, bringing the sides of the molding-box into proper position to form the block. The cement is now introduced in the usual way and the block formed. After it is formed the side walls are freed from the block by again operating the lever $J'$, when the side walls will occupy the position indicated by the dotted lines in Fig. 1. The block rests on the bottom board of the molding-box and is now removed and allowed to dry and a new board is inserted in its place, when the operation just described is repeated.

Having thus described my invention, what I claim is—

1. In a machine for making cement blocks, the frame, a molding-box having removable side and end walls supported by cleats traveling in guides formed in the frame, means for spreading the walls of the molding-box apart for the removal of the cement block, consisting of bars removably engaged to the side walls, suitable lever mechanism engaging said bars, whereby they may be forced apart or brought toward each other, and means for operating said lever mechanism, substantially as described.

2. In a machine for making cement blocks, the frame, a molding-box having removable side and end walls, the end walls being hinged to one of the side walls, means for locking the side and end walls together when assembled, means for spreading the walls of the molding-box apart for the removal of the cement block, consisting of independent bars removably engaged to the side walls, suitable lever mechanism engaging said bars, and means for operating said lever mechanism whereby said side walls may be spread apart or returned to their initial positions, substantially as described.

3. In a machine for making cement blocks, the frame, a molding-box having removable side and end walls, said side walls supported by cleats traveling in guides formed in the frame whereby the said walls may be spread apart or brought together, means for spreading apart the side walls to provide for the removal of the cement block, a removable bottom section, cores mounted on a reciprocating member traveling in suitable guides, means for raising said member and the cores mounted thereon, consisting of a rocking lever engaging said reciprocating member, means for operating said rocking lever, means for holding said cores in an elevated position consisting of swinging dogs mounted on a suitable shaft, and means for operating said shaft whereby said dogs are thrown under the reciprocating member when raised, substantially as described.

4. In a machine for making cement blocks, a molding-box provided with removable side and end walls, means for spreading the walls apart for the removal of the cement block consisting of bars removably secured to the side walls, suitable lever mechanism engaging said bars, means for operating said lever mechanism, cores mounted on a reciprocating member traveling in guides secured to the frame, a slotted lever mechanism engaging said reciprocating member by which the same may be raised, swinging dogs mounted on a suitable shaft provided with means for throwing said dogs under the reciprocating member whereby the cores are held in an elevated position while the block is being formed, substantially as described.

In testimony whereof I sign this specification in the presence of two witnesses.

JOHN MILLER.

Witnesses:
  S. E. THOMAS,
  ALLAN McLERIE.